4 Sheets—Sheet 2.
W. HALL.
Cooking Range.
No. 110,566. Patented Dec. 27, 1870.
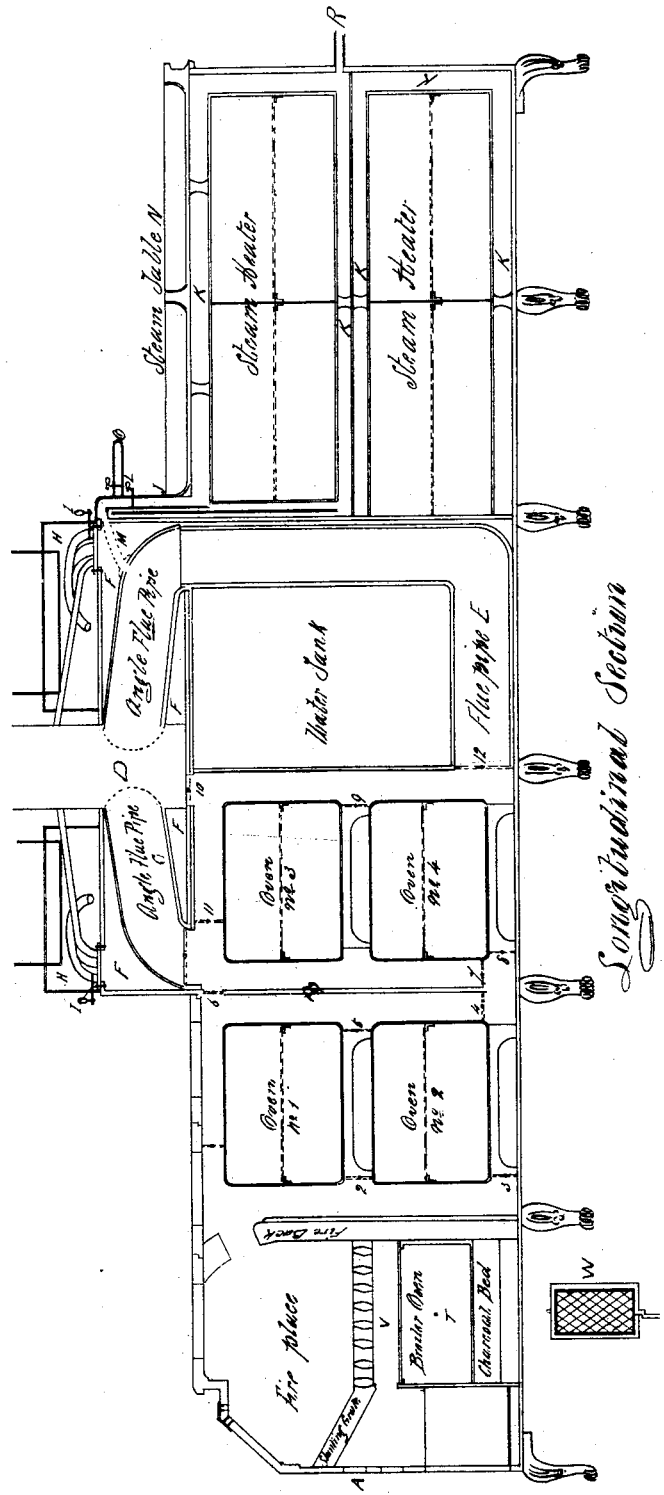
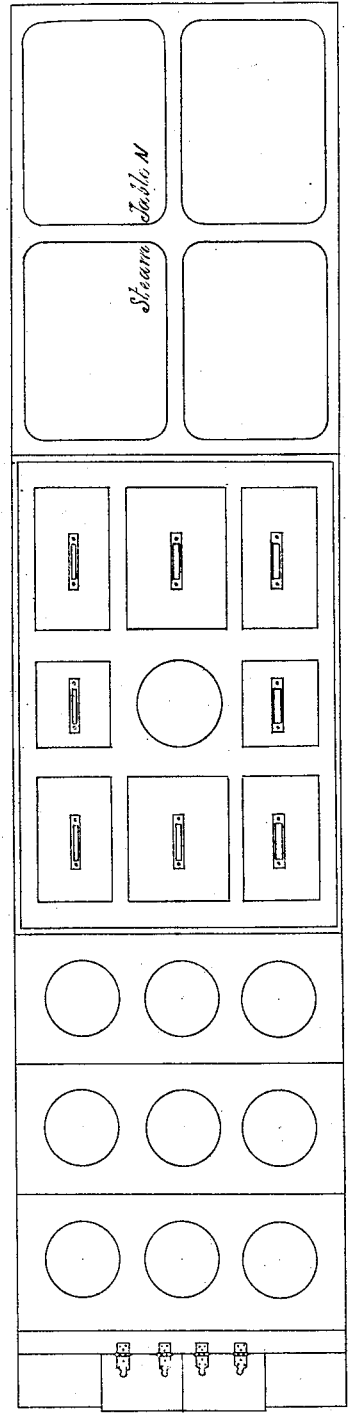

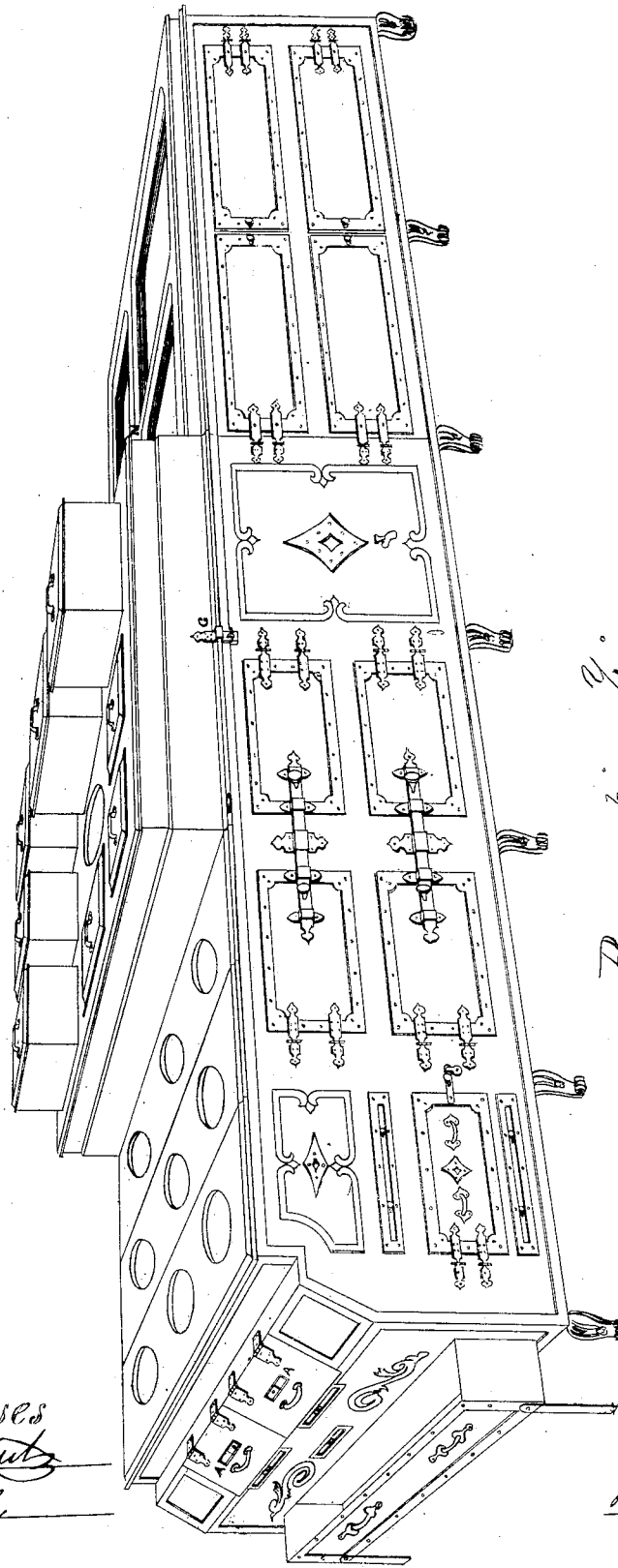

4 Sheets—Sheet 3.
W. HALL.
Cooking Range.
No. 110,566.  Patented Dec. 27, 1870.
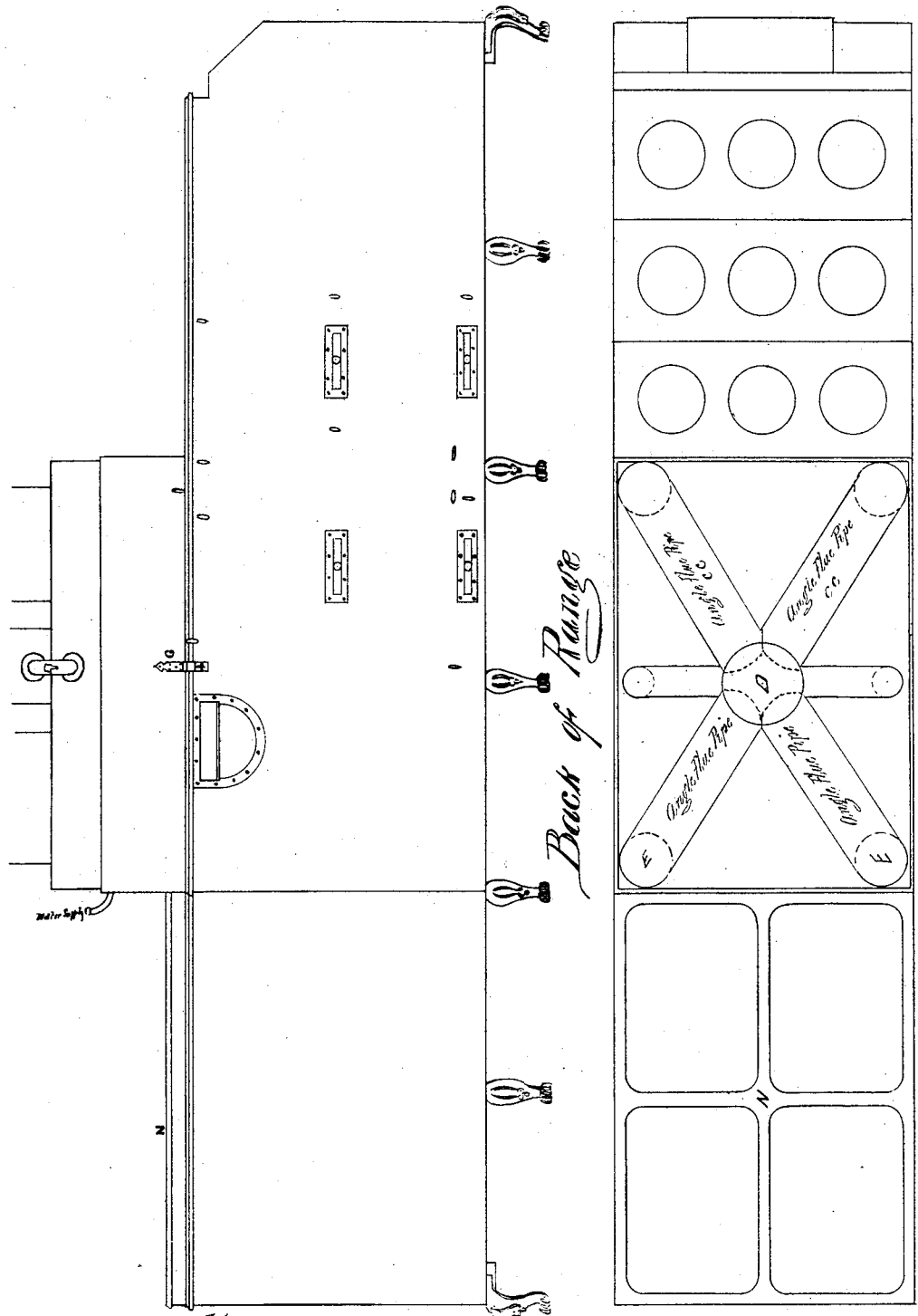
Witnesses
Inventor
William Hall 4 Sheets—Sheet 4.
W. HALL.
Cooking Range.
No. 110,566. Patented Dec. 27, 1870.
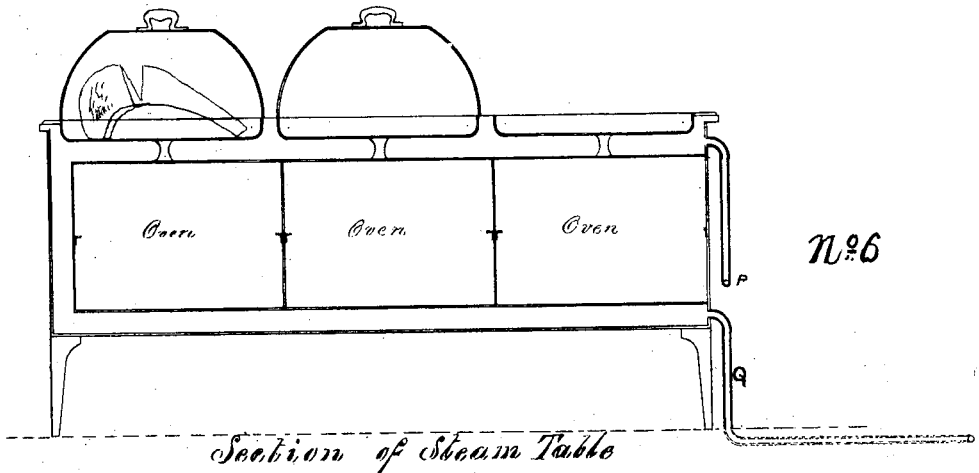
N°. 6
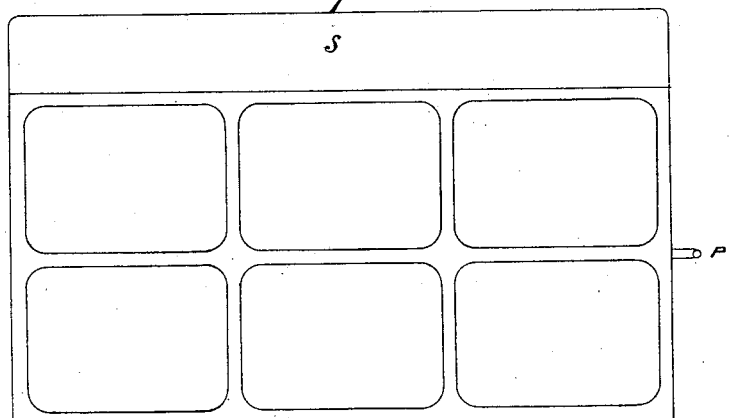
Section of Steam Table
N°. 7
Top of Steam Table
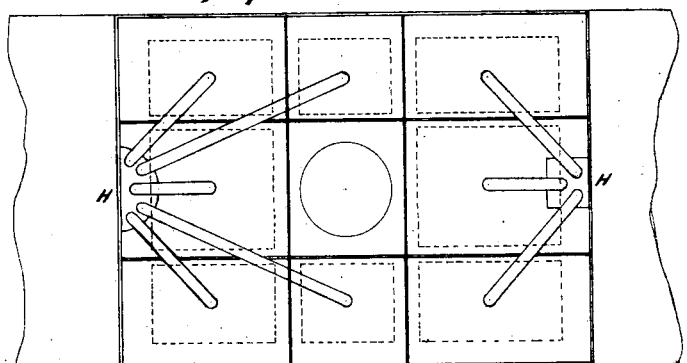
N°. 8
Witnesses Plan of Steam Table. Inventor
William Hall

UNITED STATES PATENT OFFICE.

WILLIAM HALL, OF QUINCY, ILLINOIS.

IMPROVEMENT IN COOKING-RANGES.

Specification forming part of Letters Patent No. 110,566, dated December 27, 1870.

I, WILLIAM HALL, of Quincy, in the county of Adams and State of Illinois, have invented certain Improvements in a Cooking-Range, of which the following is a specification:

Nature and Objects of the Invention.

The first part of my invention relates to the operation of the fire-place, acting with more force from its construction of curved fire-back id front draft only, without any side draft, in connection with dampers to draw flame and heat to various parts of the range.

The second part of my invention relates to the four front ovens, in connection with fire-place, heat being drawn to and about same by means of said dampers, so that the temperature of the ovens can be regulated as required.

The third part of my invention relates to the way in which I heat my water-tank.

The fourth part of my invention relates to the construction of my steam-boiler, being heated doubly quick, and as improved for cooking purposes.

The fifth part of my invention relates to the heating of my steamers on steam-boiler by pipes with apertures curved downward to equalize distribution of steam.

The sixth part of my invention relates to the heating of my steam-heater by pipes from boiler, thus economizing fuel and dispensing with chimney.

The seventh part of my invention relates to the heating of my steam-table, Nos. 6 and 7, by steam conducted by pipes from steam-boiler in range, thereby economizing and dispensing with extra steam-table heated by a separate fire.

The eighth part of my invention relates to the construction of my broiler, oven, and rotating balance-broiler, being in connection with range, and not separate, as usual.

Description of the Accompanying Drawings.

Drawing No. 1 is a perspective view of the cooking-range embodying my invention. No. 2 is a longitudinal section of same. No. 3 is a plan of top of range. No. 4 is a drawing of back of range, showing the dampers. No. 5 is a plan, showing smoke-flues from interior of range to main smoke-pipe. No. 6 is a section of steam-table, showing how steam is admitted and discharged. No. 7 shows the top of same. No. 8 is a plan, showing the operation of conducting steam from tank on cook-range to boxes under steam-tins, as shown also on plan, No. 3.

General Description.

First, I construct my fire-place in the end part of range, (see Drawing No. 2,) which will have two slide draft-holes, A on No. 1 and A on No. 2, immediately under slanting grate, made so as to give more force of draft to the body of the fire from burning out the ovens, as usual.

Second, I construct ovens No. 1 and No. 2, regulated by six dampers, which, by closing 2 and 3, will draw the draft through 1 to 6, and from thence through angle flue-pipe C, which will heat the top portion only of oven No. 1. By closing 1, 3, and 4 and opening 2, 5, and 6, the draft is brought in front of oven No. 1 and underneath and behind, thus heating three sides of oven No. 1 and the top of oven No. 2. By closing 1, 2, and 5 and opening 3, 4, and 6, the draft is brought about oven No. 1 and oven No. 2. By closing 1 and opening 2, 3, 4, 5, and 6, the draft is brought generally about oven No. 1 and oven No. 2.

Oven No. 3 and oven No. 4 are specially invented for pastry purposes, by means of a plate, B, shutting off the heat which would otherwise come from oven No. 1 and oven No. 2. These ovens are governed by fire-dampers Nos. 7, 8, 9, 10, and 11. By closing 1, 2, 4, 8, and 9 and opening 3, 7, 10, and 11, the draft is brought to the front portion and on top of oven No. 3 and front portion of oven No. 4. Closing 11 and opening 9 will bring the last draft in front and over the top of oven No. 4, the same heating bottom and back of oven No. 3. Closing 7 and 9 and opening 8 will bring said draft under the bottom of oven No. 4 and heat the back portion of both. Thus, by means of said plate B, in connection with said dampers 7, 8, 9, 10, and 11, the heat of these ovens is governed to any required temperature.

My water-tank, (marked "water-tank" on longitudinal section No. 2) is new, first, by being constructed in the center of the range, and having two flue-pipes, E, continued on the inside up back of water-tank to angle flue-pipe on said No. 2, and shown also on No. 5. The use of these flue-pipes is to assist in heating the water more rapidly by drawing the full force of the fire and smoke through same, which I contend will heat the water quicker and with no danger of their bursting, as is often the case where the water-pipes pass through the furnace.

Secondly, the water-tank being placed contiguous to oven No. 3 and oven No. 4, would heat it alone without the aid of before-mentioned flue-pipe E; but by the use of dampers 12 and 13 opposite, in conjunction, the water can be heated doubly quick, or regulated by closing dampers 12 and 13 aforesaid.

F on No. 2 is my steam-boiler, which sits on center of range, and is portable, to allow cleaning interior of range, and secured thereto by hasp and pin G.

This tank is heated doubly quick, and for generating steam by angle flue-pipes and main shaft D, (see No. 2 and No. 5,) which is an improved way of generating steam to cook by, and to supply my steam-heater K, also my steam-table N, in connection therewith, as also my steam-table No. 6.

H are my pipes, which conduct steam from boiler F to steam-boxes, (see No. 8,) which pipes are curved downward to distribute steam equally over the whole surface of under side of steam-cases, which sit on said steam-boxes. These pipes will have a faucet, I, to each, so that the steam can be turned on to one or all the steam-boxes, as required. The usual way was to set the cases on the hot water.

Secondly, by my invention the steam is utilized by use of said faucets I for heating said steam-boxes, and for heating steam-heater and steam-table, all in conjunction.

K is my steam-heater, and N my steam-table, both of which are heated by steam supplied by pipe J from steam-boiler F, before mentioned. Said steam will radiate around the whole surface of compartments of steam-heater, which is an improved way of attaching steam-heaters to range in place of hot-air dummy, as usually done.

No. 6, section of steam-table, supplied by pipe O, (see No. 2,) entering steam-table at pipe P, No. 6, radiating over whole surface of same, and discharged at exhaust-pipe Q, entering into compartment of steam-heater at pipe R, No. 2, and from said compartment into angle flue-pipe E by pipe M.

This way of heating my steam-table is better and more economical, doing away with a separate steam-table heated by a separate fire, and is neater, having shelf S, and handier to use by reason of having only to turn the steam on at pipe O, No. 2.

T is my broiler-oven, which is new, being attached to range immediately under fire-place No. 2, with a slide, V, on top, to draw out and allow hot coals to fall on charcoal-bed below, igniting it with dispatch, and then replacing top slide V, to prevent coal and ashes from falling in said broiler-oven. There will be a small opening in rear of slide V, to allow smoke and steam to ascend through grate-bars.

There will be a balance-broiler, W, No. 2, which will open to allow of meat being held between and put into a socket-hole to rotate in center of broiler-oven at pleasure, thus dispensing with the old sytem of having a separate broiler-oven apart from range.

*Claims.*

I claim as my invention—

1. The combination of the curved fire-back on No. 2, as working in connection with front draft only of slides A without any side draft, and slanting grate, in connection with dampers 1 2 3 4 5 6 7 8 9 10 11, to draw flame and smoke with redoubled force to various parts of the range, substantially as and for the purpose hereinbefore set forth.

2. The combination of said dampers and partition B with the four ovens, as and for the purposes hereto set forth.

3. The combination of flue-pipe E and dampers in water-tank, as and for the purposes set forth.

4. The combination of the steam-boiler F and angle flue-pipes E and main shaft D, substantially as and for the purpose hereinbefore set forth.

5. The elevated boiler F, provided with pipes H, regulated by faucets, as shown, and arranged in combination with the steam-heater and steam-table, as herein described.

6. The combination of my steam-heater K and my steam-table N, in connection with pipe J, substantially as and for the purpose hereinbefore set forth.

7. The combination of No. 6 section of steam-table with pipe P and pipe Q, in connection with pipe R, No. 2, connecting with pipe M and angle flue-pipe E, substantially as and for the purposes hereinbefore set forth.

8. The combination of my broiler-oven T, in connection with slide V and the balance-broiler W, substantially as and for the purpose hereinbefore set forth.

WILLIAM HALL.

Witnesses:
  M. R. BUTZ,
  C. P. FRENCH.